(12) United States Patent
Ode (10) Patent No.: US 12,520,049 B2
(45) Date of Patent: Jan. 6, 2026

(54) CONTROL APPARATUS, IMAGE PICKUP APPARATUS, LENS APPARATUS, CONTROL METHOD, AND STORAGE MEDIUM, THAT REDUCE IMAGE POINT MOVEMENT AT AN OUT-OF-FOCUS POSITION

(71) Applicant: CANON KABUSHIKI KAISHA, Tokyo (JP)

(72) Inventor: Takashi Ode, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 18/515,568

(22) Filed: Nov. 21, 2023

(65) Prior Publication Data

US 2024/0179424 A1    May 30, 2024

(30) Foreign Application Priority Data

Nov. 29, 2022  (JP) .................................. 2022-189900

(51) Int. Cl.
*H04N 23/81*    (2023.01)
(52) U.S. Cl.
CPC .................................. *H04N 23/81* (2023.01)
(58) Field of Classification Search
CPC ........ H04N 23/81; H04N 23/54; H04N 23/55; H04N 23/67; H04N 23/80
See application file for complete search history.

(56) References Cited

U.S. PATENT DOCUMENTS

| 9,277,128 | B2 * | 3/2016 | Narita | ........................ | G06T 5/80 |
| 2014/0313374 | A1 * | 10/2014 | Cao | ........................ | H04N 23/673 |
| | | | | | 348/240.1 |
| 2015/0268453 | A1 * | 9/2015 | Oe | ........................ | G02B 15/14 |
| | | | | | 359/434 |
| 2019/0377166 | A1 | 12/2019 | Komatsu et al. | | |
| 2020/0348490 | A1 | 11/2020 | Uchida et al. | | |

FOREIGN PATENT DOCUMENTS

JP         2019208168 A   * 12/2019
JP         2020010269 A     1/2020

OTHER PUBLICATIONS

Office Action issued in GB Application No. 2317901.3 mailed May 29, 2024.
Examination Report issued in India Appln. No. 20234407811, mailed Nov. 21, 2025.

\* cited by examiner

*Primary Examiner* — Antoinette T Spinks
(74) *Attorney, Agent, or Firm* — ROSSI, KIMMS & McDOWELL LLP (57) ABSTRACT

A control apparatus for processing image data acquired through an imaging optical system and an image sensor acquires first information corresponding to a magnification that is different according to an image height and second information corresponding to a magnification that is constant regardless of the image height, the first information and the second information being associated with the imaging optical system, and processes the image data using the first information and the second information to reduce image point movement at an out-of-focus position of the imaging optical system.

13 Claims, 7 Drawing Sheets

IMAGE AT INFINITY (IN-FOCUS POSITION) BEFORE IMAGE DISTORTION IS CORRECTED

IMAGE AT CLOSE DISTANCE (OUT-OF-FOCUS POSITION) BEFORE IMAGE DISTORTION IS CORRECTED IN CASE WHERE $\Delta x$ MOVES TO IMAGE SIDE SHIFT AMOUNT $\Delta x$

FIG. 5

IMAGE AT INFINITY (IN-FOCUS POSITION) BEFORE IMAGE DISTORTION IS CORRECTED

IMAGE AT CLOSE DISTANCE (OUT-OF-FOCUS POSITION) BEFORE IMAGE DISTORTION IS CORRECTED IN CASE WHERE $\Delta x$ MOVES TO OBJECT SIDE SHIFT AMOUNT $\Delta x$

FIG. 6

IMAGE AT INFINITY (OUT-OF-FOCUS POSITION) AFTER IMAGE DISTORTION IS CORRECTED

IMAGE AT CLOSE DISTANCE (IN-FOCUS POSITION) AFTER IMAGE DISTORTION IS CORRECTED IN CASE WHERE Δx MOVES TO IMAGE SIDE

SHIFT AMOUNT Δx

FIG. 7

IMAGE AT INFINITY (OUT-OF-FOCUS POSITION) AFTER IMAGE DISTORTION IS CORRECTED

IMAGE AT CLOSE DISTANCE (IN-FOCUS POSITION) AFTER IMAGE DISTORTION IS CORRECTED IN CASE WHERE Δx MOVES TO OBJECT SIDE

SHIFT AMOUNT Δx

CONTROL APPARATUS, IMAGE PICKUP APPARATUS, LENS APPARATUS, CONTROL METHOD, AND STORAGE MEDIUM, THAT REDUCE IMAGE POINT MOVEMENT AT AN OUT-OF-FOCUS POSITION

BACKGROUND

Technical Field

One of the aspects of the embodiments relates to a control apparatus, an image pickup apparatus, a lens apparatus, a control method, and a storage medium.

Description of Related Art

A lens apparatus has been recently demanded to suppress focus breathing in an image pickup apparatus using an image sensor. Japanese Patent Laid-Open No. 2019-208168 discloses a method of electronically correcting breathing.

The method disclosed in Japanese Patent Laid-Open No. 2019-208168 does not consider image point movement at an out-of-focus position, which is caused by a difference between an effective entrance pupil position of an off-axis ray and a paraxial entrance pupil position. In focus breathing correction in a lens apparatus in which the effective entrance pupil position and the paraxial entrance pupil position are different, proper focus breathing cannot be corrected unless the image point movement at the out-of-focus position is considered. As a result, an overcorrection or undercorrection state may occur.

SUMMARY

A control apparatus according to one aspect of the embodiment for processing image data acquired through an imaging optical system and an image sensor includes a memory configured to store instructions, and a processor configured to execute the instructions to acquire first information corresponding to a magnification that is different according to an image height and second information corresponding to a magnification that is constant regardless of the image height, the first information and the second information being associated with the imaging optical system, and process the image data using the first information and the second information to reduce image point movement at an out-of-focus position of the imaging optical system. An image pickup apparatus having the above control apparatus also constitutes another aspect of the embodiment. A control method corresponding to the above control apparatus also constitutes another aspect of the embodiment. A non-transitory computer-readable storage medium storing a program for causing a computer to execute the above control method also constitutes another aspect of the embodiment.

A lens apparatus according to one aspect of the embodiment includes an imaging optical system, a memory configured to store first information corresponding to a magnification that is different according to an image height and second information corresponding to a magnification that is constant regardless of the image height, the first information and the second information being associated with the imaging optical system, and a communication unit configured to transmit the first information and the second information to an image pickup apparatus in response to a request from the image pickup apparatus. The first information and the second information are information that is used to process image data from an image sensor so as to reduce image point movement at an out-of-focus position of the imaging optical system.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
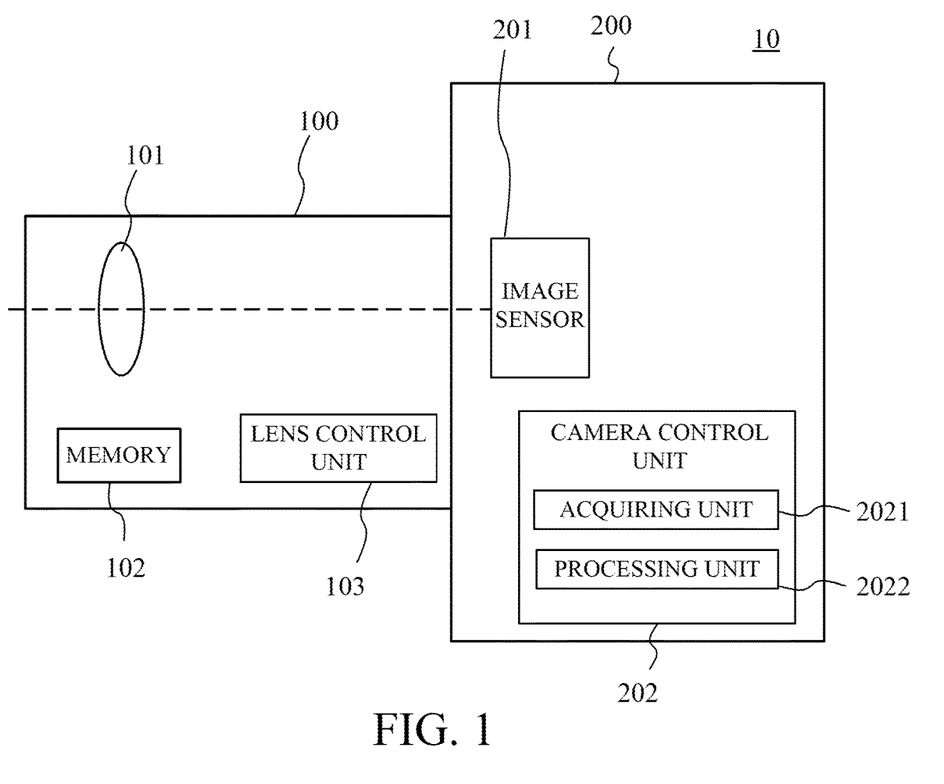
FIG. 1 is a block diagram of an image pickup system according to this embodiment.

Referring now to FIG. 1, a description will be given of an image pickup system 10 according to this embodiment. FIG. 1 is a block diagram of the image pickup system 10. The image pickup system 10 includes a camera body (image pickup apparatus) 200 and a lens apparatus 100 attachable to and detachable from the camera body 200. However, this embodiment is not limited to this example, and can also be applied to an image pickup apparatus in which a camera body and a lens apparatus are integrated with each other. In a case where the lens apparatus 100 is in an in-focus state at a first object distance (e.g. close distance), the magnification of a captured image of an object at a second object distance (e.g. infinity) is different for each angle of view, and is used for an image pickup apparatus such as a digital still camera, a broadcasting camera, and a surveillance camera. However, this embodiment is not limited to this example.

The lens apparatus 100 includes an optical system (imaging optical system) 101, a memory 102, and a lens control unit 103. The optical system 101 includes a focus lens and a zoom lens (not shown in image), and forms an image (optical image) of an object. The memory 102 stores first information corresponding to a magnification that is different according to an image height and second information corresponding to a magnification that is constant regardless of the image height. Here, the first information is aberration correction information of the optical system 101 (information for correcting a distortion amount according to distortion), and the second information is breathing correction information (focus breathing correction information). The aberration correction information may be information at an in-focus position, and the breathing correction information is information at an out-of-focus position. Thereby, proper focus breathing correction can be performed. As described below, the first information and the second information are correction information that is used to reduce image point movement (image point movement caused by a difference between the paraxial entrance pupil position and the effective entrance pupil position) at the out-of-focus position of the optical system 101. The lens control unit 103 controls each component in the lens apparatus 100 based on a command from the camera control unit 202. The lens control unit 103 functions as a communication unit that transmits first information and second information to the camera body 200 in response to a request from the camera body 200. The lens control unit 103 may also comprise a communication unit for transmitting first information and second information to the camera body 200 in response to a request from the camera body 200.

The camera body 200 has an image sensor 201 and a camera control unit 202. The image sensor 201 is a photoelectric conversion element such as a CMOS sensor or a CCD sensor, and photoelectrically converts an object image formed by the optical system 101 to output image data. The camera control unit 202 controls each component in the camera body 200. The camera control unit 202 includes an acquiring unit 2021 and a processing unit 2022. The acquiring unit 2021 acquires the first information and the second information from the lens apparatus 100 through communication with the lens apparatus 100. The processing unit 2022 uses the first information and the second information to process the image data from the image sensor 201 so as to reduce the image point movement at the out-of-focus position of the optical system 101. The processing unit 2022 changes a trimming amount of image data, for example, using the first information and the second information, thereby reducing the image point movement at the out-of-focus position.

Focus breathing is a change in a captured angle of view caused by a focal length change during focusing. Depending on the type of lens apparatus, focus breathing may significantly occur. A method is used to correct (make less noticeable) optically generated focus breathing through electric image processing to such a lens apparatus.

In other words, focus breathing is an image-point in-plane movement phenomenon, and focus breathing correction is an image-point in-plane movement correction. An electric image-point in-plane movement correction may be performed not only for focus breathing but also for image distortion in the lens apparatus. A finally output image may be the sum of these two processes.

The electric processing is performed on a breathing amount and image distortion amount for an in-focus distance of the lens apparatus, thereby making proper (or optimizing) in-plane information at an in-focus position. However, the correction information at that time is not necessarily proper information at the out-of-focus position. This is caused by a difference in the image distortion of the lens apparatus between a close end and a far end, and the correction information that is not a proper solution at the out-of-focus position.

This image distortion appears due to the addition of distortion that occurs as a result of that a ray passes through a glass, and image distortion that originally exists before the ray passes through the glass. Distortion caused by a ray passing through the glass by the same amount at both the in-focus position and the out-of-focus position. On the other hand, the image distortion that originally exists before the ray passes through the glass differs between the close end and the far end. Therefore, a distortion correction amount (optimal distortion correction amount) at the out-of-focus position does not coincide with a distortion correction amount at the in-focus position.

A description will now be given of the image distortion that originally exists before the ray passes through the glass. Image distortion before the ray passes through the glass is distortion that occurs due to a shift between the off-axis effective entrance pupil and the paraxial entrance pupil position. Here, the paraxial entrance pupil position is an image position of a diaphragm created by a lens placed closer to the ray incident direction than the diaphragm (aperture stop). Here, the diaphragm (aperture stop) is a light amount adjusting diaphragm for determining an F-number (aperture value). In an ideal lens, light passing through the center of the diaphragm converges to a single paraxial entrance pupil position before the ray passes through a first surface of the lens. This means that a height ratio relationship of each angle of view before refraction by the lens occurs has a state that always maintains a constant ratio from infinity to the close position. The fact that the ray height ratio is maintained at any object distance position means that distortion of the captured image does not occur or occurs uniformly at any object distance position. The image distortion ratio at each image height including the distortion amount generated after light passes through the lens also is equal between the in-focus position and the out-of-focus position. Thereby, electronic image distortion correction at the in-focus position can be applied to image distortion correction at the out-of-focus position.

On the other hand, in an actual lens, that is, a lens that is not in an ideal state, the paraxial entrance pupil position and the effective entrance pupil position of an off-axis ray do not coincide with each other. Due to the entrance pupil shift, the ray height ratios at each angle of view at each object distance do not coincide with each other.

Figure 2:
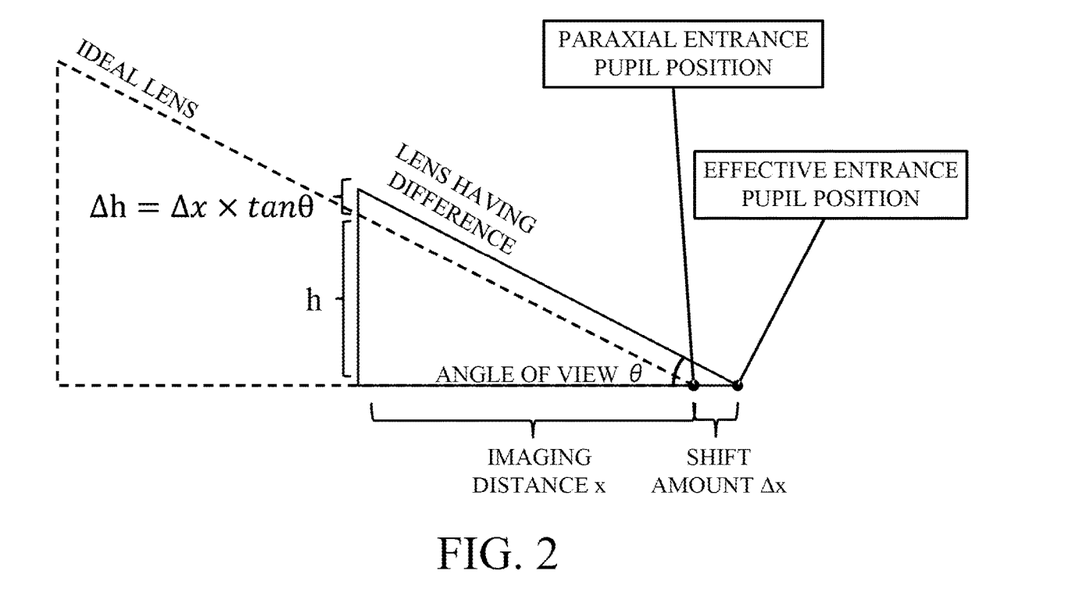
FIG. 2 is a schematic diagram of a captured ray in a case where an effective entrance pupil position does not coincide with a paraxial entrance pupil position.

FIG. 2 is a schematic diagram of a captured ray in a case where the effective entrance pupil position does not coincide with the paraxial entrance pupil position. In FIG. 2, θ is an angle of view of an incident ray, x is a distance from the paraxial entrance pupil position to the captured object, and Δx is a shift amount (difference) between the effective entrance pupil position of the ray with the angle of view θ and the paraxial entrance pupil position. Here, a ray height h of light that light having the angle of view θ, captured from an object disposed at a distance x can be expressed by the following equation (1):

$$h=(x+\Delta x)\tan\theta \quad (1)$$

If the lens is an ideal lens, equation (1) can be expressed as equation (2) below:

$$h=x\tan\theta \quad (2)$$

Therefore, the shift amount Δh from the ideal state can be expressed by the following equation (3):

$$\Delta h=(x+\Delta x)\tan\theta - x\tan\theta = \Delta x\tan\theta \quad (3)$$

Since θ is constant regardless of the object distance x, the shift amount Δh always maintains a constant amount regardless of the object distance. The shift amount Δh appears on the image sensor on a reduction side conjugate plane side as distortion of incident ray information. A distortion amount D of object-side information is expressed by the following equation (4):

$$D=\Delta h/(x\tan\theta)\times 100=\Delta x/x\times 100\ [\%] \quad (4)$$

Since the shift amount Δx has a fixed value, equation (4) indicates that the distortion amount varies according to the object distance x. This means that an image is more distorted at a close side than at a far side.

Figure 3:
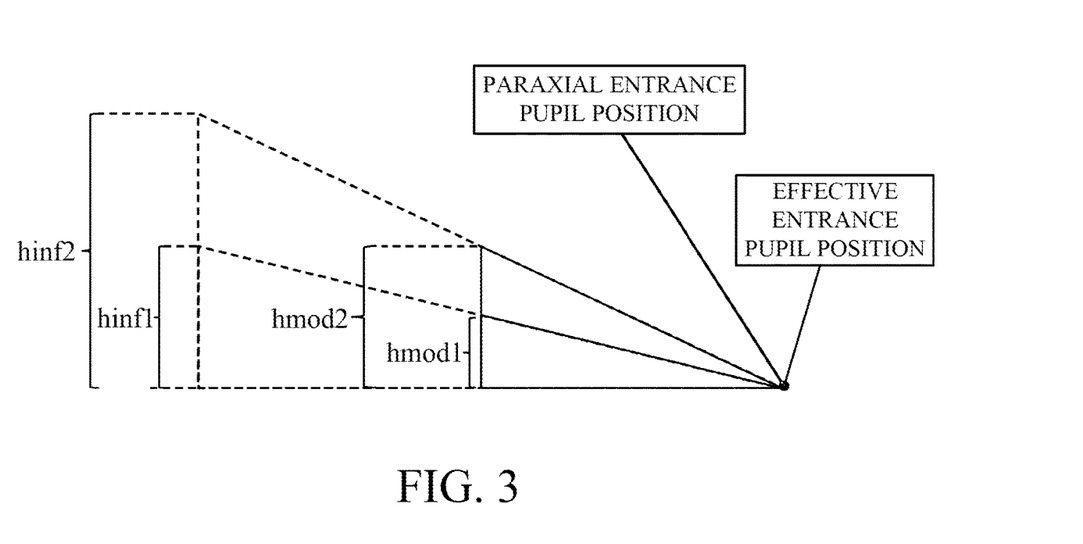
FIG. 3 explains an image height ratio in a case where the effective entrance pupil position coincides with the paraxial entrance pupil position.

In an ideal lens apparatus, a captured image height ratio at an out-of-focus position coincides with a captured image height ratio at an in-focus position. FIG. 3 explains the image height ratio in a case where the effective entrance pupil position coincides with the paraxial entrance pupil position. In FIG. 3, hinf1 and hinf2 are captured image heights in an in-focus state at infinity, and h mod 1 and h mod 2 are captured image heights at an out-of-focus position, respectively. As illustrated in FIG. 3, a ratio between the captured image heights hinf1 and hinf2 in the in-focus state at infinity is equal to a ratio of the captured image heights h mod 1 and h mod 2 at the out-of-focus position. That is, the following equation (5) is satisfied:

$$h\text{inf}2/h\text{inf}1=h\text{ mod }2/h\text{ mod }1 \quad (5)$$

However, this ratio is different in a lens apparatus where the effective entrance pupil position does not coincide with the paraxial entrance pupil position. In other words, a relationship is as illustrated in equation (6) below:

$$h\text{inf}2/h\text{inf}1 \neq h\text{ mod }2/h\text{ mod }1 \quad (6)$$

Figure 4:
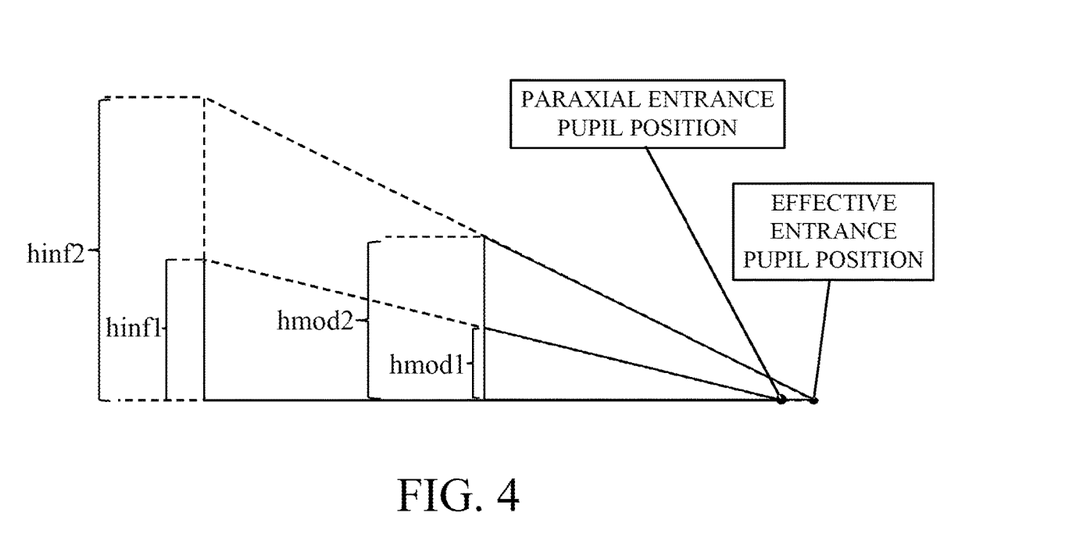
FIG. 4 explains an image height ratio in a case where the effective entrance pupil position does not coincide with the paraxial entrance pupil position.

FIG. 4 explains the image height ratio in a case where the effective entrance pupil position does not coincide with the paraxial entrance pupil position. In this case, an image appears with imaging magnification that is different at the out-of-focus position.

The pupil shift amount Δx is different for each lens, and tends to be large in wide-angle lenses. This is because the shift amount Δx is generated by suppressing distortion generated in a wide-angle lens. By making aspheric a front-spheric negative lens, the off-axis power of the wide-angle lens is weakened and distortion generated in the lens is suppressed. A configuration is used that provides a large aspherical effect by separating the rays in order to suppress distortion, but the shift amount Δx increases because this ray separation is performed by shifting the effective entrance pupil position. This shift amount Δx causes image distortion at the out-of-focus position.

Figure 5:
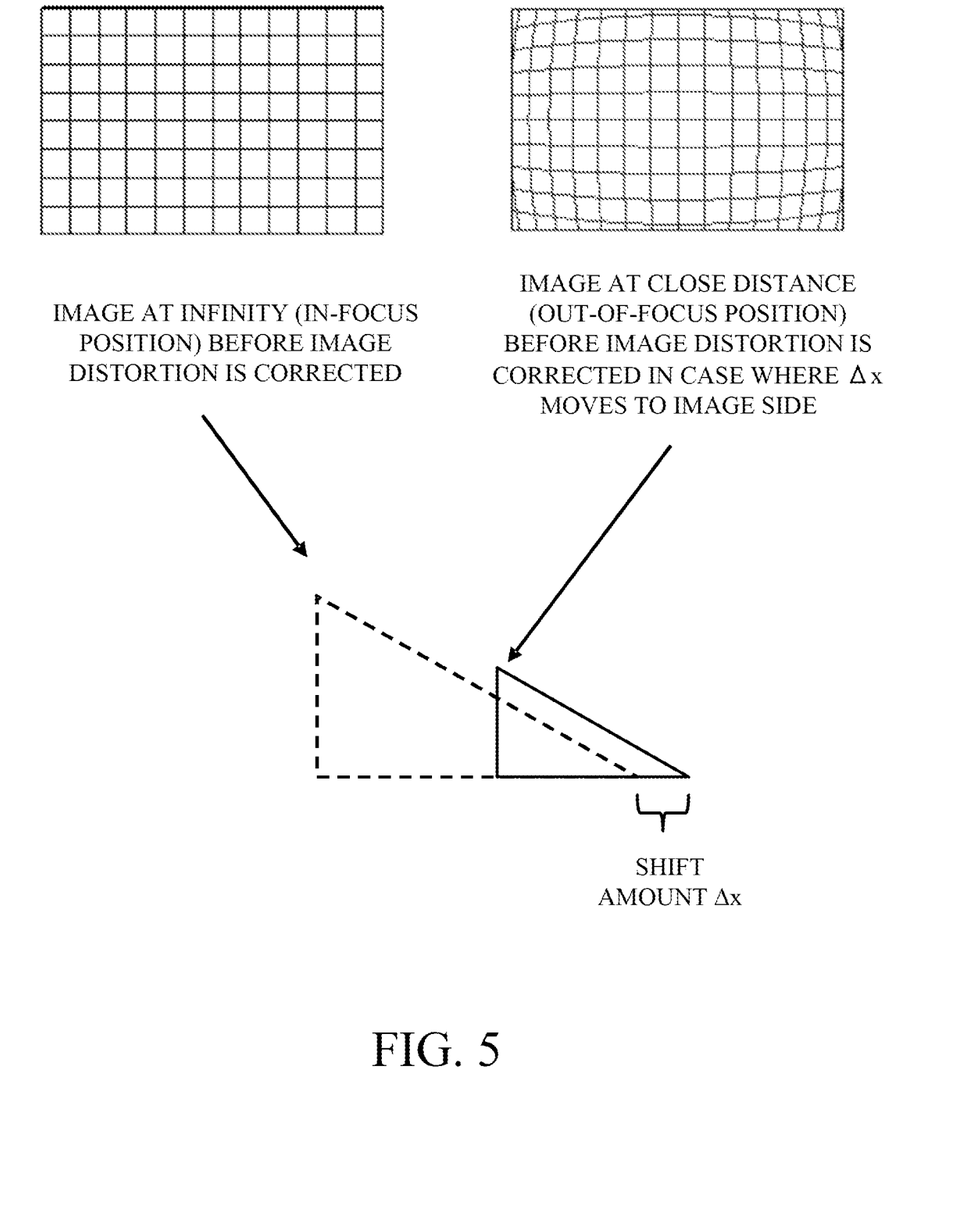
FIG. 5 explains pre-correction (uncorrected) image distortion at an out-of-focus position (in a case where a shift amount $\Delta x$ moves toward the image side).
Figure 6:
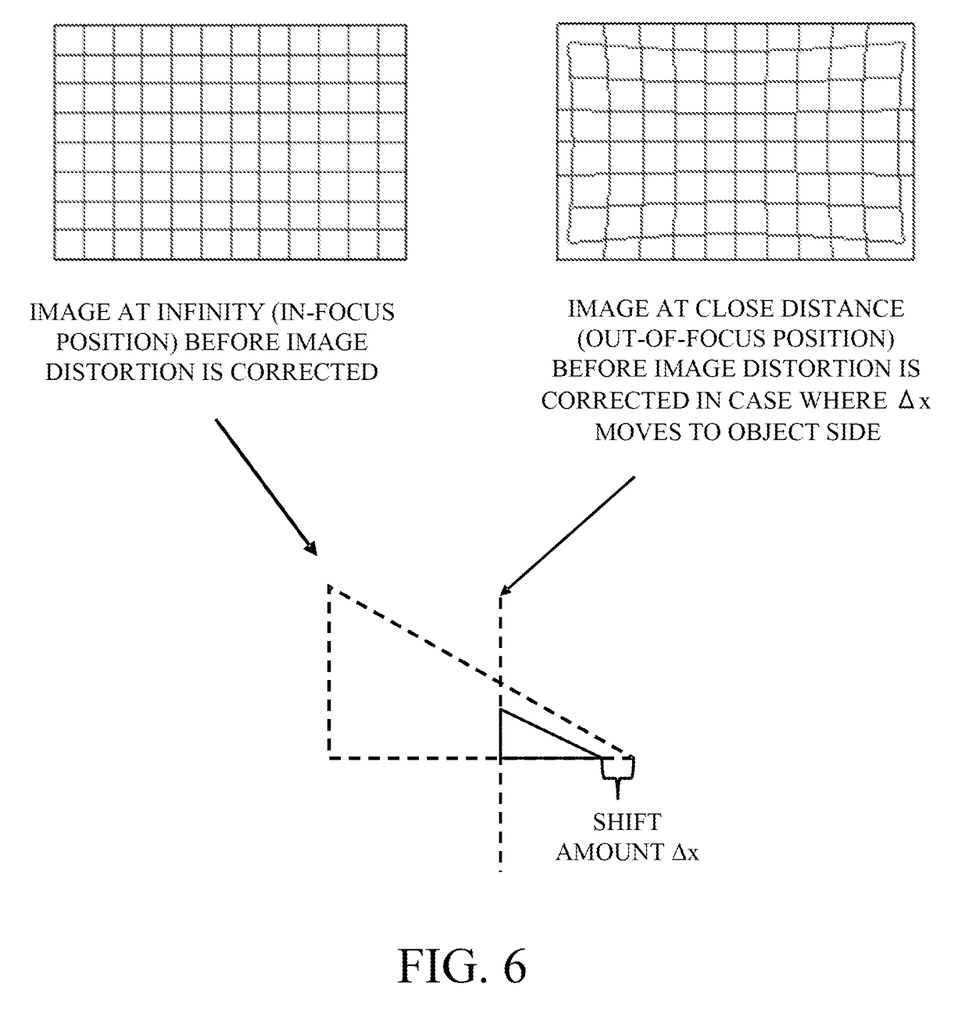
FIG. 6 explains pre-correction image distortion at an out-of-focus position (in a case where the shift amount $\Delta x$ moves toward the object side).

FIG. 5 explains image distortion at the out-of-focus position before image distortion is corrected (in a case where the shift amount Δx moves toward the image side). FIG. 6 explains image distortion at the out-of-focus position before image distortion is corrected (in a case where the shift amount Δx moves toward the object side). As illustrated in FIG. 5, in a case where the shift amount Δx moves toward the image side, image distortion occurs in which rays are captured in a range wider than an area that is originally desired to be captured (ideal state). On the other hand, as illustrated in FIG. 6, in a case where the shift amount Δx moves toward the object side, image distortion occurs in which rays are captured in a range narrower than an area for the ideal state.

Figure 7:
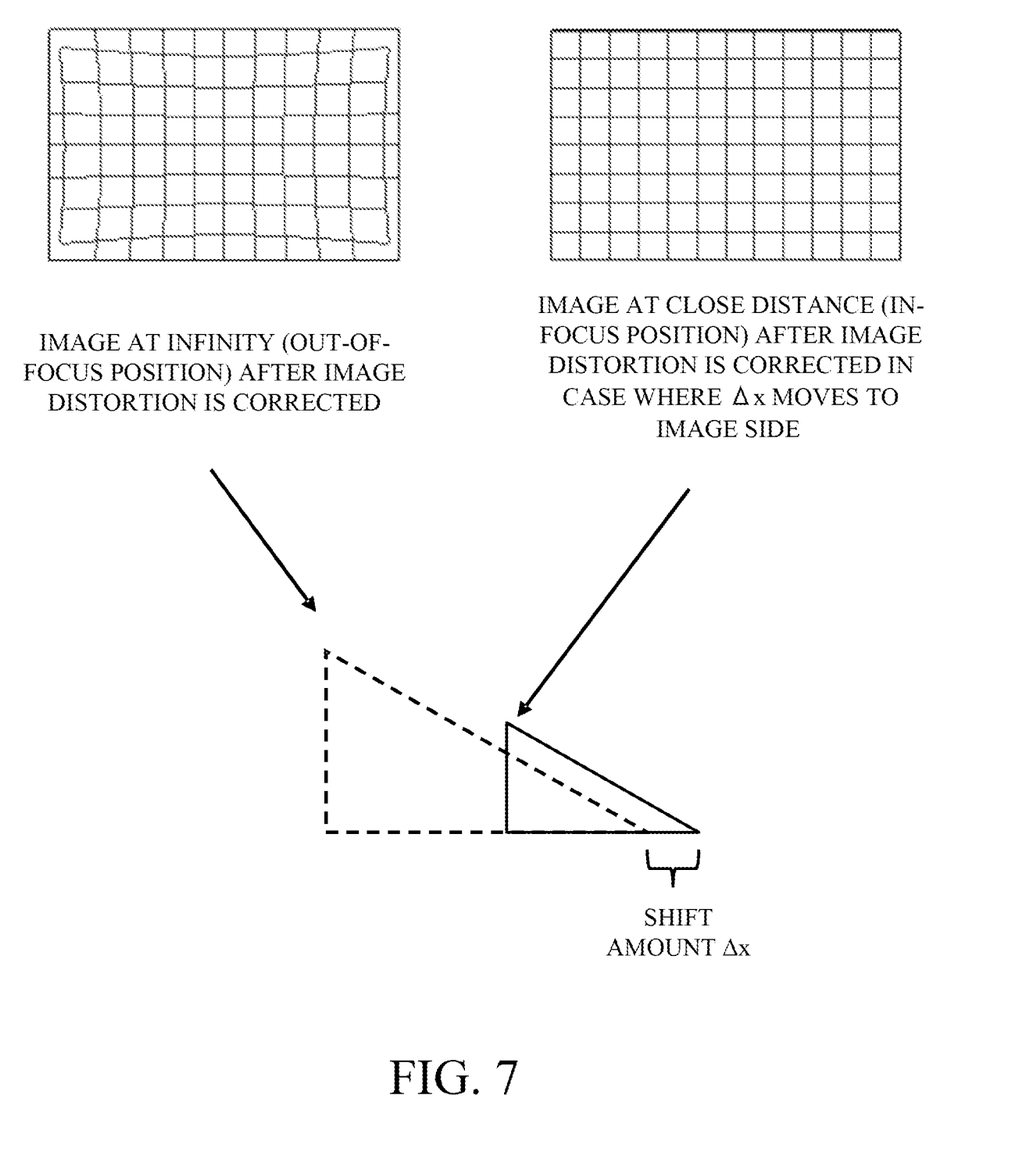
FIG. 7 explains post-correction (corrected) image distortion at an out-of-focus position (in a case where the shift amount $\Delta x$ moves toward the image side).
Figure 8:
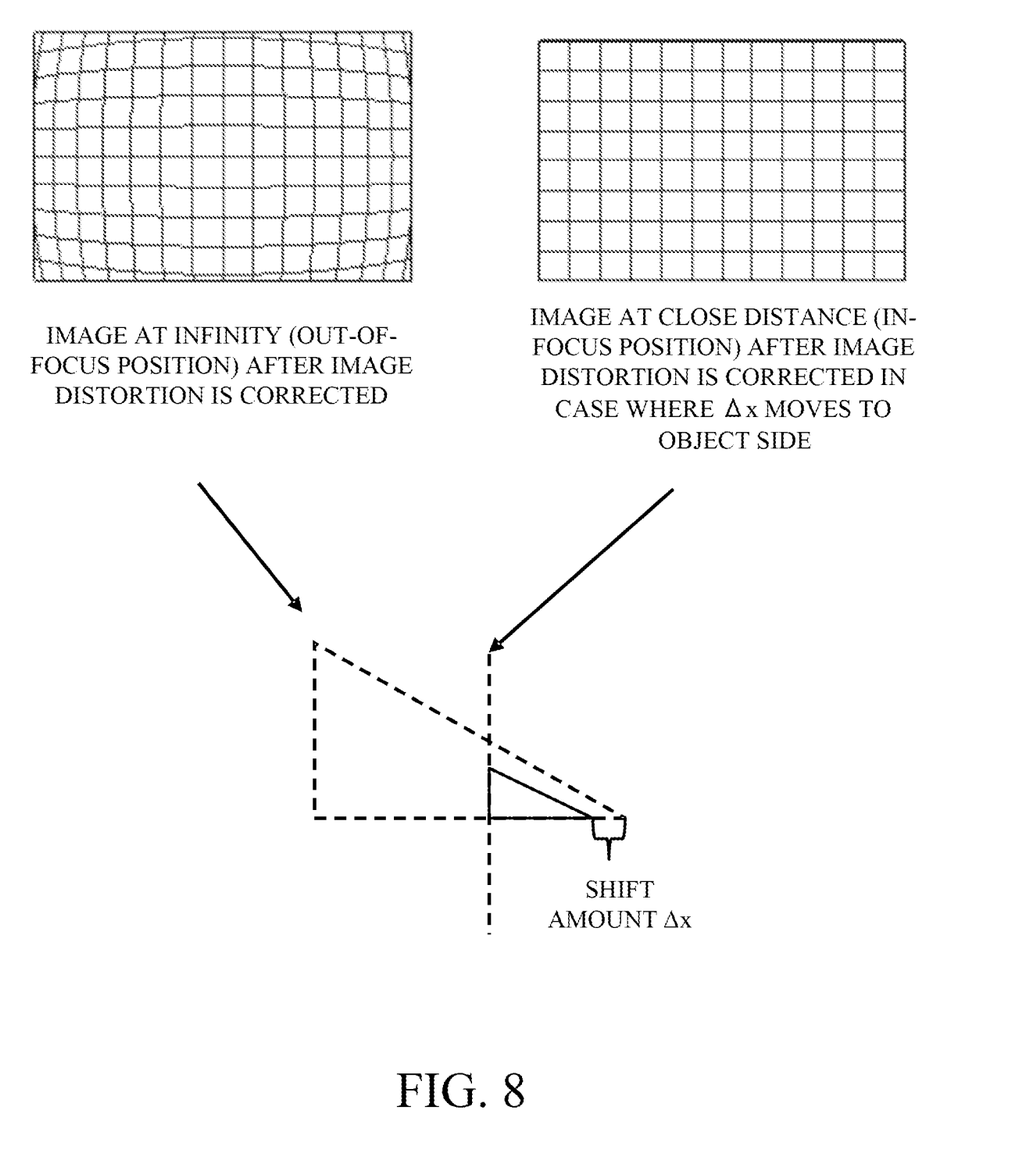
FIG. 8 explains post-correction image distortion at the out-of-focus position (in a case where the shift amount $\Delta x$ moves toward the object side).

FIG. 7 explains image distortion at the out-of-focus position after image distortion is corrected (in a case where the shift amount Δx moves toward the image side). FIG. 8 explains image distortion at the out-of-focus position after image distortion is corrected (in a case where the shift amount Δx moves toward the object side). In a case where electronic distortion correction (image distortion correction) is performed for the image distortion illustrated in FIG. 5 or 6, image distortion of a close object (image distortion at an in-focus position) is optimized as illustrated in FIG. 7 or 8, but image distortion at a distant object (image distortion at an out-of-focus position) increases. This is a phenomenon that occurs no matter which side the shift amount Δx moves to. In image distortion correction to a lens apparatus in which the paraxial entrance pupil position and the effective entrance pupil position do not match, in focusing from a distant object to a close object, the image point of the distant object appears to move, and an image point movement phenomenon, such as focus breathing appears to occur.

Figure 9:
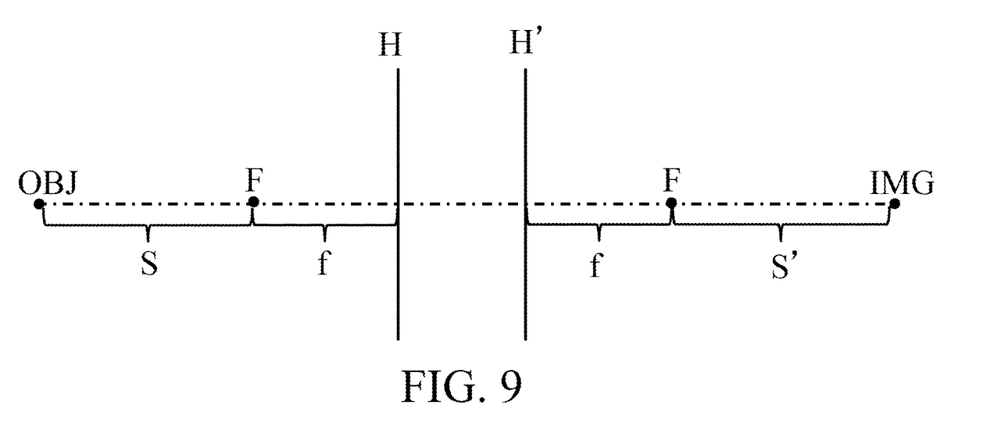
FIG. 9 explains an ideal lens apparatus.

Referring now to FIG. 9, in order to explain the relationship between the imaging magnification and the angle of view in an ideal lens apparatus, a description will be given of a case transitioning from an in-focus state on an object at infinity to an in-focus state on an object at a close distance. FIG. 9 explains an ideal lens apparatus. In focusing from an object at infinity to an object OBJ at a close distance, the lens apparatus moves an arbitrary lens, thereby moves one or both of a focal length and a principal point position of the entire system of the lens apparatus, and moves the focus position to a sensor surface IMG. In this case, the following equation (7) is satisfied:

$$s\times s'=f^2 \quad (7)$$

where f is a focal length of the entire system of the lens apparatus after the lens is moved, and s and s' are values represented by the following equations (8) and (9), respectively.

$$s=L\text{obj mod}-f \quad (8)$$

$$s'=L\text{img mod}-f \quad (9)$$

Lobj mod is a distance from a front principal plane to an object as an in-focus target, and Limg mod is a distance between a rear principal plane and an image position created at that time. At this time, the imaging magnification β mod is expressed by the following equation (10):

$$\beta \bmod = Limg \bmod / Lobj \bmod \quad (10)$$

In an ideal lens apparatus, an off-axis ray emitted from an object passes through the paraxial entrance pupil position. Thus, the following equation (11) is satisfied:

$$\tan \theta \bmod = (Y/\beta \bmod)/Lip \bmod = Y/(\beta \bmod \times Lip \bmod) \quad (11)$$

where Lip mod is a distance between the paraxial entrance pupil position and the object, Y is a sensor height, and θ mod is a capture angle of view in imaging an object at a close distance.

An angle of view θimf in imaging an object at infinity is expressed by the following equation (12):

$$\tan \theta \text{inf} = Y/\text{finf} \quad (12)$$

A change ratio R of a capture angle of view during focusing is expressed by the following equation (13):

$$R = \tan\theta\bmod \div \tan\theta\mathit{inf} \quad (13)$$
$$= (Y/(\beta\bmod \times Lip\bmod)) \div (Y/\mathit{finf})$$
$$= \mathit{finf} \div (\beta\bmod \times Lip\bmod)$$
$$= \mathit{finf} \div ((Limg\bmod/Lobj\bmod) \times Lip\bmod)$$

A numerical range of equation (13) may be set as in inequality (13a) below:

$$0.002 < \mathit{finf} \div ((Limg \bmod / Lobj \bmod) \times Lip \bmod) < 0.100 \quad (13a)$$

Inequality (13a) may be replaced with inequality (13b) below:

$$0.002 < \mathit{finf} \div ((Limg \bmod / Lobj \bmod) \times Lip \bmod) < 0.090 \quad (13b)$$

Inequality (13a) may be replaced with inequality (13c) below:

$$0.001 < \mathit{finf} \div ((Limg \bmod / Lobj \bmod) \times Lip \bmod) < 0.080 \quad (13c)$$

Here, in a case where a difference between the front principal point position and the entrance pupil position is sufficiently small relative to the object distance (for example, between the distances Lobj mod and Lip mod), the change ratio R is expressed by the following equation (14):

$$R = \mathit{finf}/Limg \bmod \quad (14)$$

Therefore, in electronically correcting the change in the angle of view during focusing in the ideal lens apparatus, it is effective to reduce or enlarge the image according to the change ratio R.

Originally, in the ideal lens apparatus, cutting an image according to a focus breathing amount can suppress changes in an expression area. This is also similar to distortion correction after light passes through the lens. However, in a lens apparatus in which the off-axis effective entrance pupil position and the paraxial entrance pupil position are different, the distortion correction amount is different between the in-focus position and the out-of-focus position, as described above. Thus, the ideal lens-based image cutout (similar to the ideal lens apparatus) cannot suppress image point movement due to pupil mismatch toward high image heights.

This image point movement significantly appears at the edges of the image sensor, but changing the focus breathing correction amount relative to the ideal lens apparatus can suppress the image point movement near the edges of the image sensor. However, in a case where additional correction is made for uniform magnification changes so as to suppress the movement of points at the four corners of the screen (image), a phenomenon occurs in which changes within the screen become larger. Therefore, it is necessary to set a correction amount to a proper value to suppress changes over the entire screen from the center to the four corners.

Figure 10:
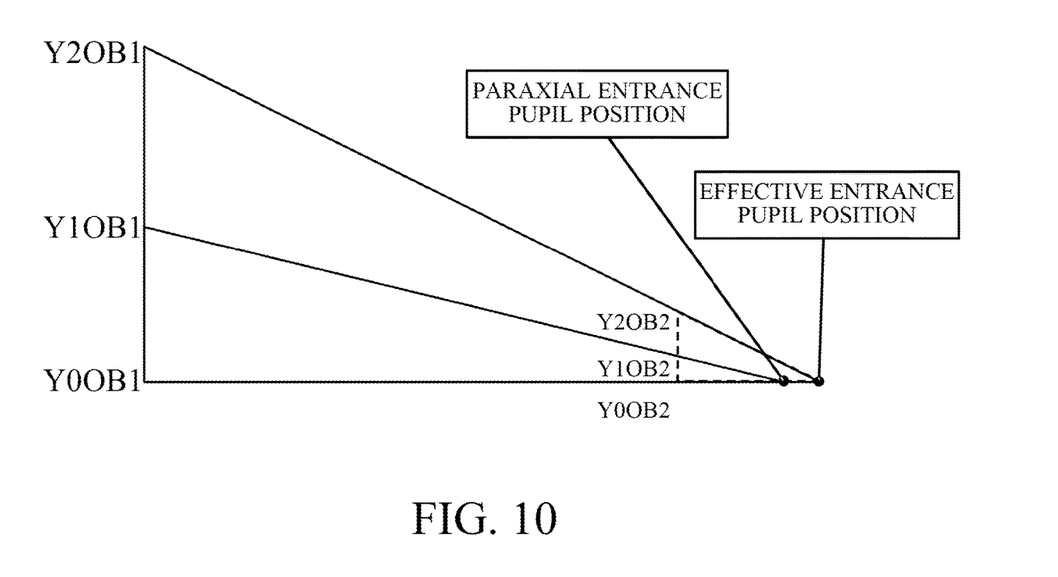
FIG. 10 explains a ratio of a pupil position shift amount.

Regarding the pupil shift amount, a height ratio of an object disposed at an in-focus position and a height ratio of an object disposed at an out-of-focus position between two arbitrary image height points on the sensor plane may be compared and a difference from the same size may be compared. FIG. 10 is an explanatory diagram of a ratio of a pupil position shift amount. More specifically, the following inequality (15) may be satisfied throughout a range that can be in an in-focus state:

$$0.005 < |\beta OB2/\beta OB1 - 1| < 1.500 \quad (15)$$

where βOB1 and βOB2 are expressed by the following equations (16) and (17), respectively:

$$\beta OB1 = \Delta Y2OB1/\Delta Y1OB1 \quad (16)$$

$$\beta OB2 = \Delta Y2OB2/\Delta Y1OB2 \quad (17)$$

Now assume that Y0 is the center on the reduction side conjugate plane (image plane of the image sensor 201), and positions separated by heights (distances) Y1 and Y2 from the center Y0. Y0OB1 is an object height at an in-focus position (enlargement side conjugate plane, object plane) corresponding to light reaching the center Y0. Y1OB1 is an object height at an in-focus position corresponding to light reaching the height Y1. Y2OB1 is an object height at an in-focus position corresponding to light reaching the height Y2. At this time, ΔY1OB1 and ΔY2OB1 in equation (16) are expressed by the following equations (18) and (19):

$$\Delta Y1OB1 = Y1OB1 - Y0OB1 \quad (18)$$

$$\Delta Y2OB1 = Y2OB1 - Y0OB1 \quad (19)$$

Y0OB2 is an object height at an out-of-focus position among light reaching Y0. Y1OB2 is an object height at an out-of-focus position among light reaching Y1. Y2OB2 is an object height at an out-of-focus position among light reaching Y2. At this time, ΔY1OB2 and ΔY2OB2 in equation (17) are expressed by equations (20) and (21) below:

$$\Delta Y1OB2 = Y1OB2 - Y0OB2 \quad (20)$$

$$\Delta Y2OB2 = Y2OB2 - Y0OB2 \quad (21)$$

βOB2/βOB1 that is close to 1 means that the pupils satisfactorily match, and the value approaches the lower limit of inequality (15).

Inequality (15) may be replaced with inequality (15a) below:

$$0.005 < |\beta OB2/\beta OB1 - 1| < 1.200 \quad (15a)$$

Inequality (15) may be replaced with inequality (15b) below:

$$0.005 < |\beta OB2/\beta OB1 - 1| < 1.000 \quad (15b)$$

Inequality (15) may be replaced with inequality (15c) below:

$$0.01 < |\beta OB2/\beta OB1 - 1| < 1.000 \quad (15c)$$

In this embodiment, the following inequality (22) may be satisfied at either the far end or the close end of the optical system 101.

$$0.002 < |(\gamma/R) - 1| < 0.200 \quad (22)$$

Inequality (22) represents a difference between the breathing correction in the ideal lens apparatus and the actually applied correction amount. γ is the actually applied correction amount (second information). R is a value expressed by the following equation (23):

$$R = finf/Limg \bmod \quad (23)$$

Here, finf is a focal length of the entire system of the lens apparatus in the in-focus state at infinity, and Limg mod is a distance from the rear principal point position to the image plane in an in-focus state on an object closer to image sensor 201 than infinity. In a case where the value becomes lower than the lower limit of inequality (22), it means that there is almost no change in the conventional breathing correction, and the image point movement on the high image height side cannot be satisfactorily suppressed at the out-of-focus position. On the other hand, in a case where the value becomes higher than the upper limit of inequality (22), the high image height side is excessively corrected and the image point movement inside the screen stands out.

Inequality (22) may be replaced with inequality (22a) below:

$$0.003 < |(\gamma/R) - 1| < 0.080 \quad (22a)$$

Inequality (22) may be replaced with inequality (22b) below:

$$0.005 < |(\gamma/R) - 1| < 0.050 \quad (22b)$$

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide a control apparatus, an image pickup apparatus, a lens apparatus, a control method, and a storage medium, each of which can provide proper focus breathing correction.

This application claims the benefit of Japanese Patent Application No. 2022-189900, filed on Nov. 29, 2022, which is hereby incorporated by reference herein in its entirety.

What is claimed is:

1. A control apparatus for processing image data acquired through an imaging optical system and an image sensor, the control apparatus comprising:
   a memory configured to store instructions; and
   a processor configured to execute the instructions to:
   acquire first information corresponding to a magnification that is different according to an image height and second information corresponding to a magnification that is constant regardless of the image height, the first information and the second information being associated with the imaging optical system; and
   process the image data using the first information and the second information to reduce image point movement at an out-of-focus position of the imaging optical system,
   wherein the following inequality is satisfied at one of a far end or a close end of the imaging optical system:

$$0.002 < |(y/R) - 1| < 0.200,$$

where y is the second information and R=finf/Limgmod, finf being a focal length of the imaging optical system in an in-focus state at infinity and Limgmod being a distance from a rear principal point position to an image plane in an in-focus state on an object at a position closer to the image sensor than infinity.

2. The control apparatus according to claim 1, wherein:
   the first information is aberration correction information for each in-focus position of the imaging optical system, and
   the second information is breathing correction information at the out-of-focus position.

3. The control apparatus according to claim 1, wherein the processor acquires the first information and the second information from a lens apparatus through communication with the lens apparatus.

4. The control apparatus according to claim 1, wherein the following inequality is satisfied:

$$0.002 < finf + ((Limgmod/Lobjmod) \times Lipmod) < 0.100,$$

where Lobjmod is a distance from a front principal plane to the object and Lipmod is a distance between a paraxial entrance pupil position and the object.

5. The control apparatus according to claim 1, wherein the following inequality is satisfied:

$$0.005 < |\beta O\beta 2 / \beta O\beta 1 - 1| < 1.500,$$

where $\beta O\beta 1 = Y2OB1/Y1OB1$, $\beta O\beta 2 = Y2OB2/Y1OB2$, $\beta OB1$ is a ratio between an object height Y1OB1 on the enlargement side conjugate plane corresponding to light reaching a height Y1 on the reduction side conjugate plane and an object height Y2OB1 corresponding to light reaching a height Y2 of the reduction side conjugate plane, and $\beta OB2$ is a ratio between an object height Y1OB2 at a position different from the enlargement side conjugate plane corresponding to the light reaching the height Y1 on the reduction side conjugate plane and an object height Y2OB2 at a position different from the enlargement side conjugate plane corresponding to the light reaching the height Y2 on the reduction side conjugate plane.

6. The control apparatus according to claim 1, wherein the processor simultaneously performs correction processing using the first information and correction processing using the second information.

7. The control apparatus according to claim 1, wherein the processor is configured to trim the image data using the first information and the second information to reduce image point movement at the out-of-focus position of the imaging optical system.

8. An image pickup apparatus comprising:
an image sensor; and
the control apparatus according to claim 1.

9. A lens apparatus comprising:
an imaging optical system;
a memory configured to store first information corresponding to a magnification that is different according to an image height and second information corresponding to a magnification that is constant regardless of the image height, the first information and the second information being associated with the imaging optical system; and
a communication unit configured to transmit the first information and the second information to an image pickup apparatus in response to a request from the image pickup apparatus,
wherein the first information and the second information are used to process image data from an image sensor so as to reduce image point movement at an out-of-focus position of the imaging optical system, and
wherein the following inequality is satisfied at one of a far end or a close end of the imaging optical system:

$$0.002<|(y/R)-1|<0.200,$$

where y is the second information and R=finf/Limgmod, finf being a focal length of the imaging optical system in an in-focus state at infinity and Limgmod being a distance from a rear principal point position to an image plane in an in-focus state on an object at a position closer to the image sensor than infinity.

10. The lens apparatus according to claim 9, wherein in an in-focus state at a first object distance, magnification of a captured image of an object at a second object distance is different for each angle of view.

11. A control method for processing image data acquired through an imaging optical system and an image sensor, the control method comprising:
an acquiring step of acquiring first information corresponding to a magnification that is different depending on an image height and second information corresponding to a magnification that is constant regardless of the image height, the first information and the second information being associated with the imaging optical system; and
a processing step of processing the image data using the first information and the second information to reduce image point movement at an out-of-focus position of the imaging optical system,
wherein the following inequality is satisfied at one of a far end or a close end of the imaging optical system:

$$0.002<|(y/R)-1|<0.200,$$

where y is the second information and R=finf/Limgmod, finf being a focal length of the imaging optical system in an in-focus state at infinity and Limgmod being a distance from a rear principal point position to an image plane in an in-focus state on an object at a position closer to the image sensor than infinity.

12. A non-transitory computer-readable storage medium storing a program executable by a computer to execute the control method according to claim 11.

13. A control apparatus for processing image data acquired through an imaging optical system and an image sensor, the control apparatus comprising:
a memory configured to store instructions; and
a processor configured to execute the instructions to:
acquire first information corresponding to a magnification that is different according to an image height and second information corresponding to a magnification that is constant regardless of the image height, the first information and the second information being associated with the imaging optical system; and
process the image data using the first information and the second information to reduce image point movement at an out-of-focus position of the imaging optical system,
wherein the following inequality is satisfied:

$$0.002<finf+((Limgmod/Lobjmod) \times Lipmod)<0.100,$$

where finf is a focal length of the imaging optical system in an in-focus state at infinity, Limgmod is a distance from a rear principal point position to an image plane in an in-focus state on an object at a position closer to the image sensor than infinity, Lobjmod is a distance from a front principal plane to the object, and Lipmod is a distance between a paraxial entrance pupil position and the object.

* * * * *